United States Patent [19]
Belmont et al.

[11] Patent Number: 6,119,172
[45] Date of Patent: *Sep. 12, 2000

[54] ACCESS CONTROL FOR A TV/PC CONVERGENCE DEVICE

[75] Inventors: Brian V. Belmont, Dallas; Kevin J. Brusky, Magnolia, both of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,851

[22] Filed: Jan. 21, 1997

[51] Int. Cl.⁷ ........................................ G06F 15/16
[52] U.S. Cl. .................... 709/250; 709/229; 348/552
[58] Field of Search .................. 395/200.8, 200.49; 348/569, 588, 510, 552, 493; 709/250, 229; 455/2, 6.3; 345/327

[56] References Cited

U.S. PATENT DOCUMENTS

| | | | |
|---|---|---|---|
| 5,563,665 | 10/1996 | Chang | 348/552 |
| 5,675,390 | 10/1997 | Schindler et al. | 348/552 |
| 5,712,688 | 1/1998 | Eglit | 348/510 |
| 5,790,201 | 8/1998 | Antos | 348/552 |
| 5,805,806 | 9/1998 | McArthur | 395/200.8 |
| 5,819,156 | 10/1998 | Belmont | 455/2 |
| 5,896,179 | 4/1999 | Eglit | 348/493 |
| 5,900,867 | 5/1999 | Schindler et al. | 345/327 |

OTHER PUBLICATIONS

Kohiyama et al., Development of a Digital TV System for Use in Computer Systems, IEEE Transactions on Consumer Electronics, vol. 35, No. 3, Aug. 1989, p. 624–629.

Antonoff, Michael, *The Big–Tube PCTV*, May 28, 1996, three pages from Internet site.

*Gateway 2000 Sells Destination™ Big Screen PC Through Retail Chains*, four pages from Internet site.

*Gateway 2000 launches Destination™ big screen PC featuring 31–inch monitor*, five pages from Internet site.

*Destination Features*, five pages from Internet site.

*Primary Examiner*—Zarni Maung
*Assistant Examiner*—Patrice Winder

[57] ABSTRACT

A TV/PC convergence device, operable in a television mode, a computer mode and a combination television/computer mode, includes a display, a computer and an interface coupled between the display and the computer. The display receives and displays images in all three modes. The computer executes programs and is operable in the computer mode and the combination television/computer mode. The interface includes a access control device for selectively controlling the switching between the television mode, the computer mode and the combination television/computer mode.

15 Claims, 2 Drawing Sheets

ACCESS CONTROL FOR A TV/PC CONVERGENCE DEVICE

FIELD OF THE INVENTION

The present invention relates to TV/PC convergence devices, and more particularly to an access control system for limiting access to select users from being able to switch between the television mode and the personal computer mode of the TV/PC convergence device.

BACKGROUND OF THE INVENTION

A TV/PC convergence device is a fully functional computer integrated with a television, providing TV viewing (via broadcast, cable, Digital Satellite, or other broadcast media) and personal computing functionality. This convergence of computer and television enables a user the combined access to both television program information and computer and Internet information.

Typically a TV/PC convergence device consists of a fully function computer including fax/modems, CD-ROM players, and media storage such as hard drives and floppy drives. The computer is interfaced with a television, often a big screen TV, with the television's NTSC interlaced signal being converted to a scan VGA signal or the computers scan VGA signal being converted to an NTSC interfaced signal. Because the TV/PC convergence device is controlled by the computer's operating system, the TV/PC convergence device can, among other things, display PC applications and TV programs on a single monitor. The convergence of the personal computer and the television into a single device also permits the utilization of the communications bandwidth, mass storage and graphics of the computer to deliver, store and display small applications during a traditional television viewing environment. The TV/PC convergence device also changes a typical television from just a passive viewing device to a user interactive device. For example, if a user is watching a television program, the TV/PC convergence device will enable the user to download information about that particular program, such as from a web site where additional information about or related to the program might be located.

Unlike most home computers which are usually used by a single user in a somewhat private area of the home such as a study, the TV/PC convergence device is intended to be used by all members of the family and therefore will be used in a more public area of the home such as the family room and living room. This means that the TV/PC device will be also accessible to neighbors, friends, and other guests in your home. And unlike a regular television, the TV/PC convergence device, which includes a computer, will often have files containing important and confidential data which a user may not want anyone else to view or corrupt. Therefore it is very important that a user be able to prevent data files from being corrupted by restricting others from using at least a portion of the computer in the TV/PC convergence device while still allowing access to the TV mode of operation.

SUMMARY OF THE INVENTION

The present invention overcomes the above identified problems as well as other shortcomings and deficiencies of existing technologies by providing a TV/PC convergence device having an access control for limiting access to select users from being able to switch from television to personal computer mode or from television mode to a combination television/personal computer mode.

The present invention further provides a TV/PC convergence device operable in a television mode, a computer mode and a combination television/computer mode. The TV/PC convergence device includes a display, a computer and an interface coupled between the display and the computer. The display receives and displays images in all three modes. The computer executes programs and is operable in the computer mode and the combination television/computer mode. The interface includes a control device for controlling the switching between the three modes.

The present invention also provides a computer system having a display, a computer and an interface. The display receives and displays images, such as television images, video images and computer images. The computer system further is coupled to the display and executes computer programs, including interfacing with the Internet, and the interface selectively interfaces the display and the computer. The interface includes a control device for the controlling of the interface between the display and the computer.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
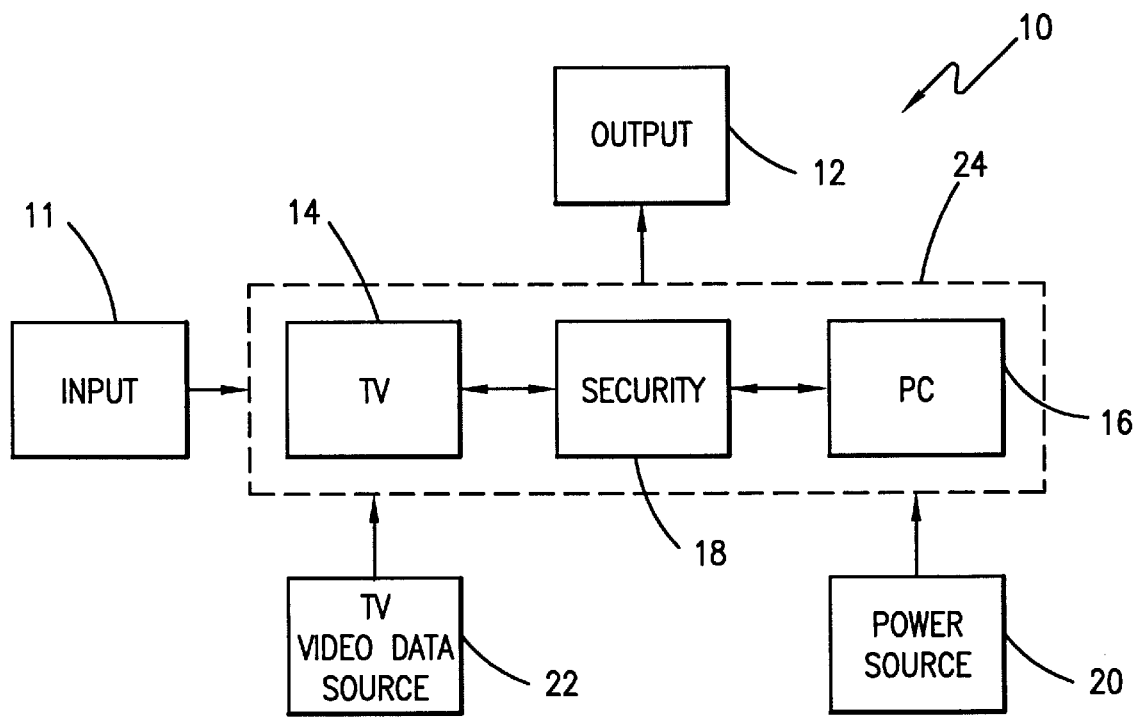
FIG. 1 is a block diagram illustrating a system utilizing the present invention.

With reference now to the figures wherein like or similar elements are designated with identical reference numerals, there are depicted block diagrams of TV/PC systems in accordance with the method and system of the present invention. The purpose of these block diagrams is to illustrate the features of the invention and the basic principles of operation of an embodiment thereof. These block diagrams are not necessarily intended to schematically represent particular modules of circuitry or any particular data or control paths.

Referring now to FIG. 1, there is shown a block diagram illustrating a TV/PC convergence system 10. TV/PC convergence system 10 includes an input 11, and output 12, a television (TV) 14, a computer (PC) 16, a security device 18, a power source (power) 20 and a TV/video/data source 22. TV 14, PC 16 and security device 18 are coupled to form a TV/PC convergence device 24.

In general operating, TV/PC convergence device 24 is powered from power source 20 and can be operated in various modes. It can be operated in a typical television mode, a personal computer mode, and a combination television/personal computer mode. When in a typical television mode, information received from TV/video/data source 22 is displayed on a display device of TV 14. When TV/PC convergence device 24 is being operated in the typical personal computer mode, PC 16 is utilized to perform typical computer functions such as executing and running software, playing games, and interfacing with the Internet. PC 16 utilizes the display device of TV 14 to display its output.

TV/PC convergence device 24 can also be utilized in a combination mode utilizing the functionality of both TV 14 and PC 16. As described above, TV/PC convergence device 24 will enable a user to use the PC mode to interact with the television mode such as by downloading information about a particular program from the Internet. It will also permit a user to use the television mode to interact with the PC mode such as by having a small television window displaying a show or video while performing normal PC operations. A user can also readily switch between PC mode and television mode so that, for example, during commercials, a user can readily switch from television mode to computer mode to perform some PC operations until the television program resumes, at which time the user can switch back to television mode.

Security device 18, described in more detail herein below, generally prevents or limits access to select persons to be able to switch to or utilize the PC mode of TV/PC convergence system 10. For example, when powered up, TV/PC convergence may by default enter only television mode, or only enter television mode with limited access to the computer mode. That is, there is restricted access to parts of the computer that are user sensitive. A user must pass a security check to be able to further utilize computer 16. Once passed the security check, a user can readily flip between television mode and computer mode until security device 18 is reset. The reset could occur when TV/PC convergence system 10 is re-powered up, or after a time limit has elapsed.

As further illustrated in FIG. 1, TV/PC convergence device 24 includes an output 12 for outputting data and information such as to another television, a printer, a modem, an external disk drive and other computer and television peripherals.

Figure 2:
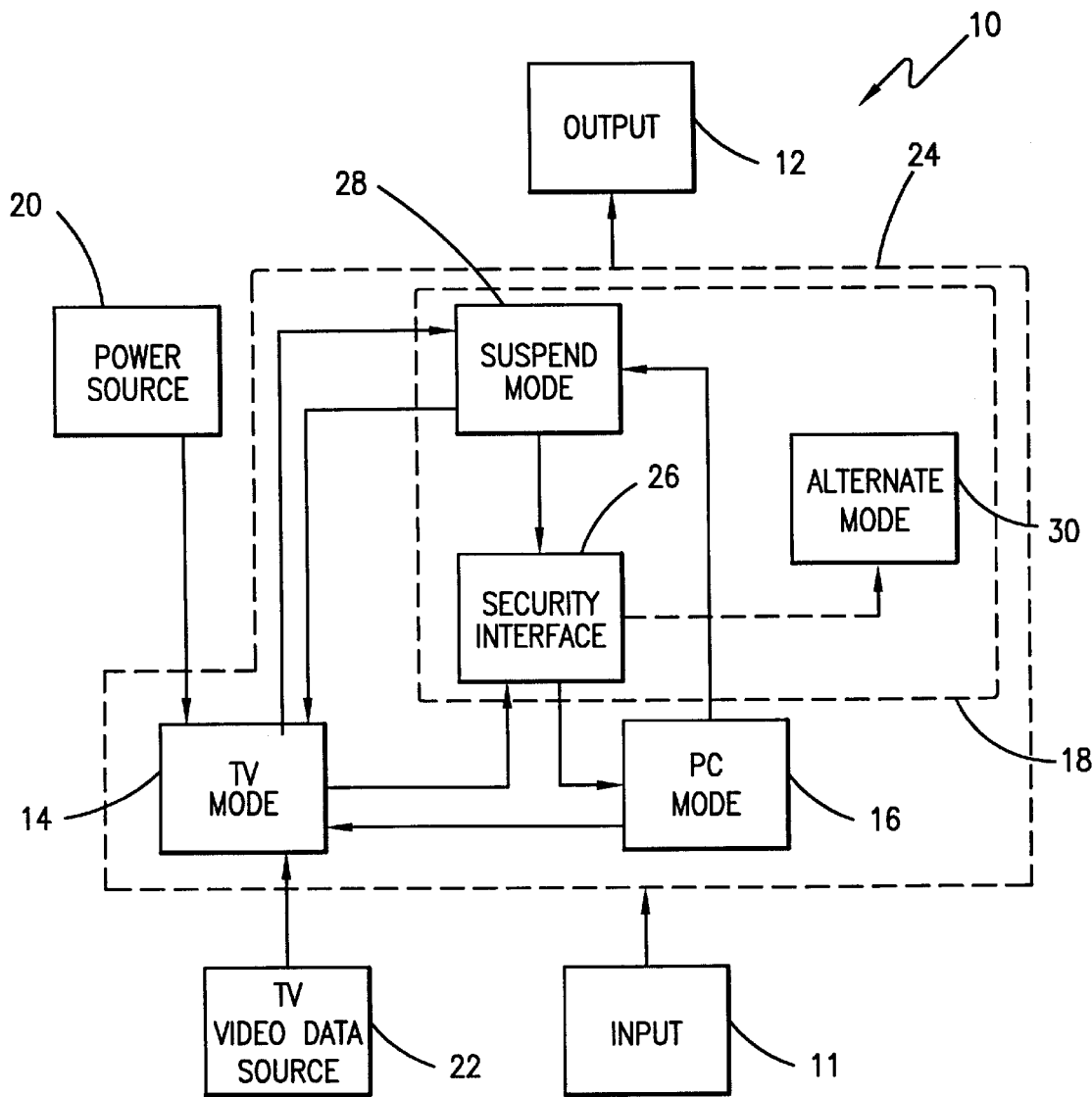
FIG. 2 is a flow control block diagram of a system utilizing the present invention.

Referring now to FIG. 2, there is shown a more detailed block diagram of TV/PC convergence system 10, and, in particular, security device 18 has been illustrated in a more detailed block diagram. As depicted security device 18 includes a security interface 26, a suspend mode 28 and an alternate mode 30.

A more detailed operation of TV/PC convergence system 10 will now be described. TV/PC convergence device 24 receives power from power source 20, and when turned on, TV/PC convergence device 24 is initially in TV mode 14. If a user desires to enter or utilize PC mode 16, the user must first be cleared by security interface 26. As can be appreciated, security interface 26 can be either hardware, software, or a combination thereof. As described above, security interface 26 will not permit a user access to PC mode 16 until the user is cleared. This can be accomplished for example by the user entering an authorized selected code or password to input 11, which could be any combination of alpha and/or numeric characters. Although good results have been achieved utilizing alpha/numeric characters, it is contemplated to be within the scope of this invention to utilize other types of security interfaces or passwords, such as voice prints, finger prints, and security badges. The selected code can be entered via input 11 using a remote control alpha/numeric keypad, a computer keyboard, a wireless or remote keyboard or keypad, or virtually any type of input device.

If a correct or selected code is entered, security interface 26 will permit access to PC mode 16. However, if an incorrect code is received by security interface 26 there are a number of options available. For example, in one option access to PC mode 16 will be denied and TV mode 14 will continue to operate. A second option would force the unauthorized user to enter suspend mode 28 where any access to both TV mode 14 and PC mode 16 will be suspended and will not be reinstated until TV/PC convergence device 24 is powered down and re-powered up. Another option is to force the unauthorized user to enter an alternate mode 30 where the user could only then access certain selected functions of TV mode 14, such as childrens' TV programming.

It is also contemplated to be within the scope of this invention to implement multiple users for security device 18, each having a corresponding security code. It is also contemplated that with multiple users, the users could have different levels of access to TV mode 14 and PC mode 16. For example, in TV mode, a certain channels could be locked or have limited access, and in PC mode a child could have access to childrens' programs, while an adult might have complete access to PC mode 16.

As described above correct entry of a valid selected code will give the user access to PC mode 16. From this point on, the user may freely switch between PC mode 16 and TV mode 14 without having to re-enter the select security code. The options for requiring the re-entry of the security code are numerous, such as when one of the following occurs: power to TV/PC convergence device 24 is shut off; when a user selected period of time has elapsed and the user has subsequently exited the system; or when a new or different user logs-in.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A computer system operable in a computer mode, a television mode and a combination a television/computer mode, said computer system comprising:

a television for receiving and displaying images;

a computer coupled to said television, said computer for executing programs and for generating images to be displayed on said television;

an interface coupled between said television and said computer for selectively interfacing said television and said computer, said interface including a controled device for controlling the selective interfacing between said television and said computer; and an input coupled to said interface, said input for recieving security information;

wherein said control device is responsive to said input receiving security information such that if said security information received at said input corresponds to select information, said control device permits interfacing between said television and said computer by said interface.

2. The computer system as recited in claim 1, wherein said security information is alpha/numeric information.

3. The computer system as recited in claim 1, and further comprising:

an input device for generating said information to be received by said input, said input device including a keyboard.

4. The computer system as recited in claim 3, wherein said keyboard is wireless.

5. A TV/PC convergence device operable in a television mode, a computer mode, and a combination television/computer mode, said TV/PC convergence device comprising:

a display for receiving and displaying images;

a computer coupled to said display, said computer for executing programs and for generating images to be displayed on said display, said computer operable in the computer mode and the combination television/computer mode;

an interface coupled between said display and said computer for interfacing said display and said computer, wherein said display can display images generated by said computer when said interface is interfacing said display and said computer and when said computer is being operated in the computer mode or the combination television/computer mode; and wherein said interface includes a control device for selectively controlling the switching between the television mode, the computer mode, and the combination television/computer mode.

6. The TV/PC convergence device as recited in claim 5, and further comprising:

an input coupled to said interface, said input for receiving code information; and wherein said control device selectively controls the switching between the television mode, the computer mode, and the combination television/computer mode in response to code information received at said input.

7. The TV/PC convergence device as recited in claim 6, and further comprising:

an input device for generating said information to be received by said input, said input device including a keyboard.

8. The TV/PC convergence device as recited in claim 7, wherein said keyboard is wireless.

9. The TV/PC convergence device as recited in claim 8, wherein said code information is alpha/numeric information.

10. A computer system comprising:

a first-video signal generator for generating a first video signal;

a second video signal generator for generating a second video signal;

a display coupled to said first and said second video signal generators, said display for displaying images derivable from said first video signal and said second video signal; the images derivable from said first video signal being displayable to a plurality of users and the images derivable from said second video signal being displayable to a subset of the plurality of users with the subset of the plurality of users being different from the plurality of users; and an input receiver coupled to said second video generator, said input receiver for receiving input identifying a select user of the plurality of users as within the subset of plurality of users.

11. The computer system of claim 10, wherein the input is alpha/numeric information.

12. The computer system of claim 10, further comprising:

an input device for generating the input to be received by said input receiver.

13. The computer system of claim 10, wherein said second video signal generator is a personal computer.

14. The computer system of claim 10, wherein said first video signal is a television signal.

15. The computer system of claim 10, further comprising:

a controller coupled to said input receiver, said controller responsive to the input received at said input receiver such that the display does not display images derivable from the second video signal when a select user is not within the subset of the plurality of users.

* * * * *